June 18, 1935.                B. BURNS                2,005,254
FILM TAKE-UP MECHANISM
Filed April 25, 1931        3 Sheets-Sheet 3
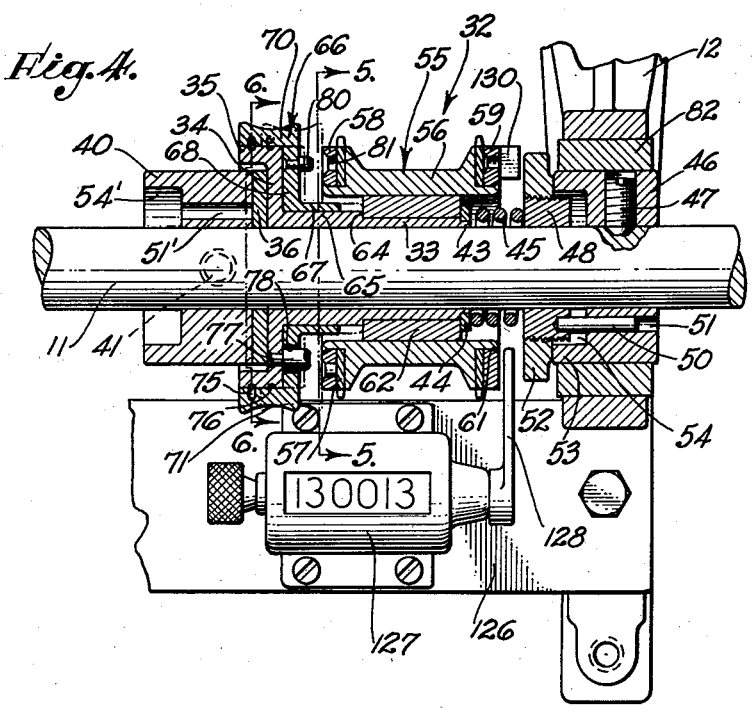
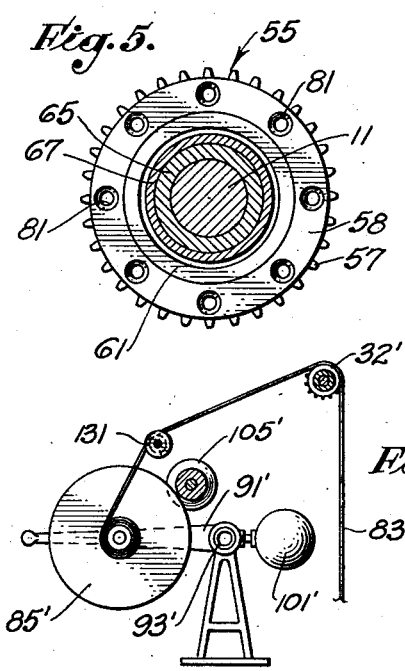
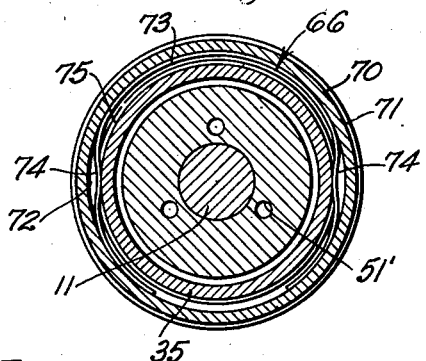
INVENTOR:
Bruce Burns,
BY
ATTORNEY.

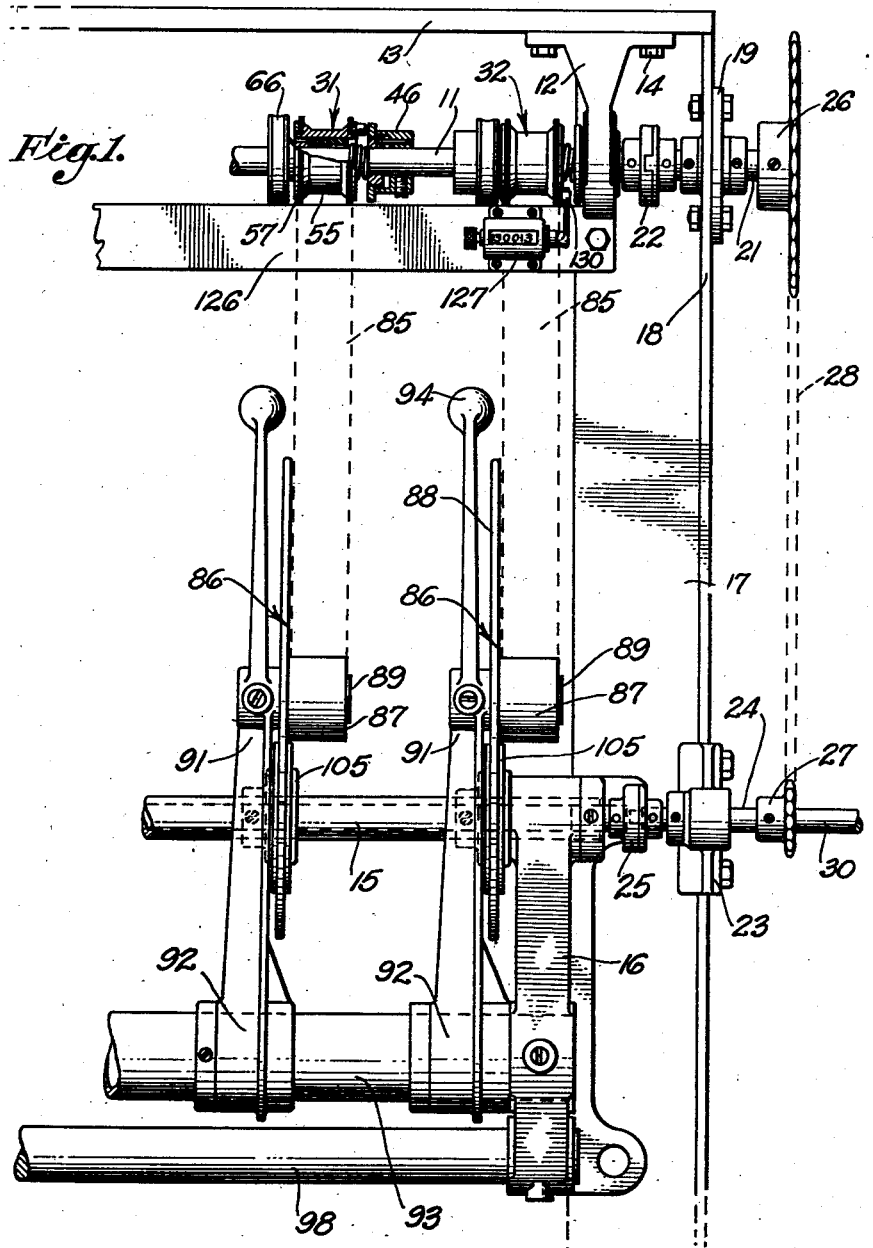

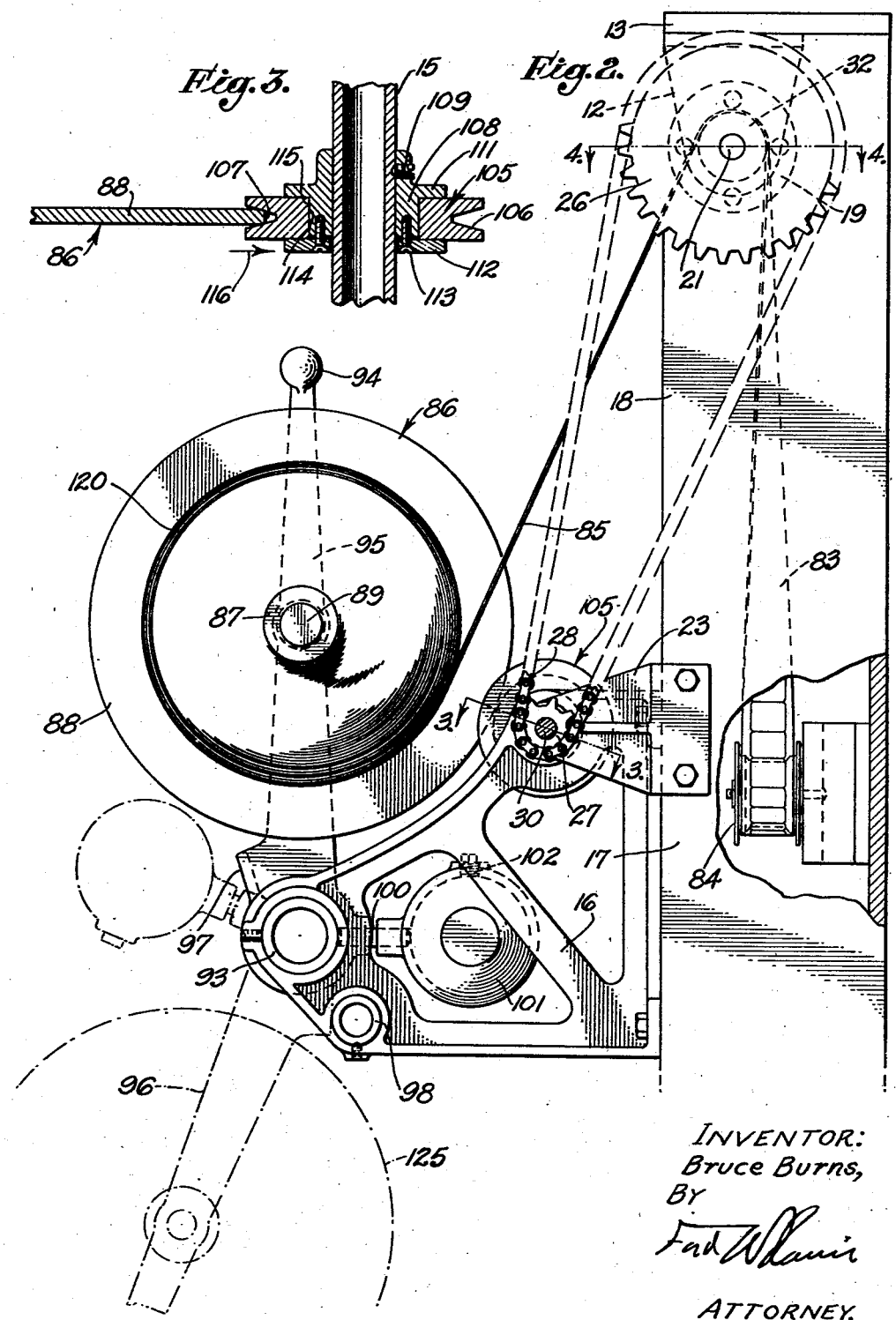

Patented June 18, 1935

2,005,254

UNITED STATES PATENT OFFICE 2,005,254

FILM TAKE-UP MECHANISM

Bruce Burns, Los Angeles, Calif., assignor, by mesne assignments, to Hughes Industries Co., Ltd., Los Angeles, Calif., a corporation of Delaware Application April 25, 1931, Serial No. 532,806

9 Claims. (Cl. 271—2.3)

My invention relates to a film take-up mechanism for taking film from a film handling or film treating device, such as a film developing machine, film coloring machine, etc.

My present invention is of particular utility with continuous film developing machines and at present finds its principal utility in conjunction with the film developing device disclosed in my U. S. application Ser. No. 532,805, filed April 25, 1931. This type of film developing device employs no sprockets within the device itself for moving the strips of film through the various stages of the treatment and is so constructed that a relatively small tension or pull exerted on the end of the film will produce movement of the film through the developing device.

It is an object of my invention to provide a film take-up mechanism having a pulling or motivating means which will produce a constant movement of the film but is yieldable in its characteristics so as to be incapable of exerting on the film a tension in excess of a predetermined maximum, this predetermined maximum being well below the breaking point of the film so that in the use of the device there is no danger of breakage of the film by the pulling means should the film be caught at any point preceding the pulling means.

It is an object of the invention to provide a device of simple and novel construction whereby a plurality of pulling means may be mounted in a minimum of space, and it is a feature of the construction that the pulling means are selectively operable and releasable, making it possible to discontinue the pulling of any film strip which may have become caught or which may have parted in the preceding film handling mechanism, without interrupting the movement of the remaining film strips.

A further object of the invention is to provide a pulling device of the above character having a film sprocket yieldably driven through a readily adjustable friction means, the parts of which are so constructed as to enable a compact assembly of a plurality of pulling means in a minimum of space.

A further object of the invention is to provide a take-up mechanism having yieldably driven receiving means for receiving the film strips, such receiving means including removable film spools so supported for operation that they may be readily interchanged and are at all times positively yet yieldably motivated.

A further object of the invention is to provide a film receiving means employing a film spool, a constantly rotating member, and a driving member frictionally driven by said rotating member, there being means for holding the driving member in driving engagement with the film spool.

A further object of the invention is to provide in this film receiving means a rotating member having a grooved ring frictionally mounted thereon, such grooved ring being adapted to engage the periphery of the film spool in such a manner as to be relatively geared thereto. Slippage, due to difference in the speed of rotation of the film spool and the rotating member, occurs between the rotating member and the grooved ring which is frictionally mounted thereon.

A further object of the invention is to provide in this film receiving device a rotating member in the form of a shaft, a plurality of grooved driving members frictionally mounted in spaced relationship along the shaft, and means for supporting a plurality of film spools in such positions that the peripheries of the film spool flanges will be held in pressural engagement with the grooves of the respective driving members.

It is a further object of the invention to mount the film spools on movable supports and to provide means for moving these film spool supports so as to hold the film spool flanges in engagement with the grooved driving members with sufficient pressure to produce the desired driving operation.

It is a further object of the invention to provide this movable support in the form of a pivoted arm having an eccentric weight member associated therewith for causing the arm to rotate toward its associated driving member. These film spool supporting arms are so placed that they may be individually swung outwardly into the open space adjacent the film take-up mechanism, thereby making it possible to readily exchange film spools, and further making it possible to assemble a plurality of film spools in side by side relationship in a very small space.

Further objects and advantages of the invention will be made evident throughout the following part of the specification.

Referring to the drawings, which are for illustrative purposes only,

Fig. 1 is a front elevation showing the rightward end of a film take-up mechanism embodying my invention.

Fig. 2 is a right end elevation corresponding to Fig. 1.

Fig. 3 is an enlarged fragmentary section on a plane represented by the line 3—3 of Fig. 2.

Fig. 4 is an enlarged fragmentary sectional view on a plane represented by the line 4—4 of Fig. 2, this view showing the complete assembly of a single film pulling means.

Fig. 5 is a cross-section on a plane represented by the line 5—5 of Fig. 4.

Fig. 6 is a cross-section on a plane represented by the line 6—6 of Fig. 4.

Fig. 7 is a cross-sectional view drawn to reduced scale showing a preferred form of take-up mechanism which may be used where space is sufficient to permit placing of film spools in horizontal positions.

As shown in Figs. 1 and 2, my invention employs a rotating member in the form of a shaft 11 which is supported in a horizontal position by brackets such as indicated at 12, the brackets 12 being secured to a horizontal structural member 13 by means such as screws 14. A second shaft or rotating part 15 is mounted in a horizontal position below the shaft 11. This rotating part 15 is journaled in a bracket 16 which is mounted on the face of a post 17. A vertical wall 18 supports an upper bearing plate 19 which carries an upper drive shaft 21 having driving connection with the shaft 11 through a flexible coupling 22. A bracket 23 mounted on the wall 18 supports a lower driving shaft 24 having driving engagement with the rotating part 15 through a flexible coupling 25. Sprockets 26 and 27 are mounted on the upper and lower drive shafts 21 and 24, and a chain 28 is carried over these sprockets so that when the driving shaft 24 is rotated by power applied to the extending end 30 thereof, the upper drive shaft 21 and the rotating member 11 will be driven in timed relationship to the rotating part 15. On the rotating member or shaft 11 a plurality of film pulling or motivating means 31 and 32 are mounted, the details of these motivating means being clearly disclosed in Fig. 4, in which I show the motivating means 32 which is a counterpart of the motivating means 31.

Mounted on the shaft 11, as shown in Fig. 4, is a sleeve 33 which has a radial flange 34 and a cylindrical wall 35 at the periphery of this flange 34. This sleeve 33 is not keyed to the shaft 11 but is yieldably driven by the frictional engagement of the outer face of the flange 34 with a friction plate 36 carried on a collar 40 which is fixed to the shaft 11 by means of a set screw 41 or analogous means. The rightward diametrically reduced end 43 of the sleeve 33 carries a flange or washer 44 against which a compression spring 45 bears. Means for placing a desired compression in the spring 45 is formed by a collar 46 which is fixed to the shaft 11 by means of a set screw 47, a sleeve 48 which is axially movable on the shaft 11 but is prevented from rotation relative to the shaft 11 and the collar 46 by a pin 50 which extends from the rightward portion of the sleeve 48 into an opening 51 in the collar 46, and an adjustment nut 52 threaded on the sleeve 48 in a position to engage the lip 53 surrounding a counterbore 54 in the leftward end of the collar 46. By rotating the nut 52 relative to the sleeve 48, the sleeve 48 may be caused to move axially so as to vary the axial dimension of the space between the ring or washer 44 and the sleeve 48, thereby accomplishing a variation in the compression of the spring 45.

The collar 40 is substantially the same size and construction as the collar 46 and has a longitudinal opening 51' therein and also an open recess 54'. This similarity of the collars 40 and 46 is established so that the collar 40 can be used in the same manner as the collar 46 to receive the thrust from an adjustment nut 52 of an adjacent sprocket assembly, thus making it possible to mount the sprockets close together on the shaft 11.

By suitably varying the compression of the spring, the pressure with which the flange 34 of the sleeve 33 engages the friction plate 36 may be adjusted to provide a desired frictional driving engagement between the collar 40 and the sleeve 33. Surrounding the rightward end of the sleeve 33 is a cylindrical film sprocket 55 consisting of a cylindrical body 56 having toothed rings 57 secured on the ends thereof by means of rings 58 and 59, which rings 58 and 59 are held in place by spinning or flanging outwardly the cylindrical lips 61 at the ends of the body 56. Secured within the body 56 is a cylindrical bearing member 62 which is retained between the washer 44 and a shoulder 64 existing at the rightward end of the diametrally enlarged portion 65 of the sleeve 33 adjacent the flange 34. The sprocket 55 may rotate on the sleeve 33 but has practically no axial movement. On the leftward portion 65 of the sleeve 33 is a clutch member 66 including an inner cylindrical wall 67 having sliding engagement on the enlarged portion 65, a radial wall 68, and an outer cylindrical wall 70 which fits over the cylindrical wall 35 of the sleeve 33. The cylindrical wall 70 has a shallow groove 71 cut in the outer face thereof so that the clutch member may be manually engaged so as to be moved between operative and inoperative positions. As shown in Figs. 4 and 6, a groove 72 is cut in the inner face of the wall 70, and in this groove is set a circular spring 73 having inwardly bent portions 74 adapted to engage shallow grooves 75 and 76 in the outer face of the wall 35. When the clutch member 66 is in retracted or inoperative position, as shown in Fig. 4, the portions 74 of the spring 73 engage the groove 75 and thus yieldably hold the clutch member 66 in such retracted position. The clutch member is caused to rotate with the sleeve 33 by a pin 77 which extends from the radial wall 34 of the sleeve 33 and projects through an opening 78 in the radial wall 68 of the clutch member 66. A projection 80 in the form of a short pin extends from the wall 68 of the clutch member 66 in a position to engage any one of a plurality of holes 81 formed in the ring 58 of the pulling sprocket 55, the outer ends of the openings 81 being beveled, as shown in Fig. 4, so as to permit facile engagement of the pin 80 with a hole 81.

When it is desired to drive the sprocket 55, the clutch member 66 is moved rightwardly, causing the resilient engaging portions 74 of the spring 73 to move from engagement with the groove 75 and into engagement with the groove 76. During this movement of the clutch member 66, the pin 80 engages a hole 81, thus establishing a driving engagement between the yieldably and frictionally driven sleeve and the sprocket 55. The bracket 12 supports a journal 82 which receives the body 46, the result being that the body 46 then serves as a bearing for the shaft 11.

As shown in Fig. 2, films 83 are led over rollers such as indicated at 84 and pass vertically upwardly into engagement with the pulling sprockets 31 and 32. These films are then carried over the top of the pulling sprockets and downwardly, as indicated at 85, to film spools 86 forming part of the film receiving means. As shown in Figs. 1 and 3, these film spools 86 each include a hub 87 and a radial flange 88. A hole is bored to fit a stub shaft 89 which extends from a lever arm 91, the lower end 92 of which is pivoted on a horizontal shaft 93 extending between the brackets 16. On the upper ends of the lever arm 91 a handle 94 is formed to provide means whereby the lever arm may be readily swung from the upright position indicated at 95 to the lowered position indicated by broken lines 96. Each of the lever arms 91 is provided with a shoulder or stop 97 adapted to engage a cooperating stop member consisting of a tubular shaft 98 extending horizontally between the brackets 16. By means of a short bar 100, a hollow eccentric weight member 101 is secured to each lever member 91 in such position that the weight member 101 will tend to rotate the lever arm 91 in clockwise direction when the lever arm 91 is moved into upright position, and will tend to rotate the lever arm 91 in anticlockwise direction when the lever arm 91 is swung into lowered position, as indicated at 96. Each weight member 101 is provided with a plug-closed opening 102 through which means, such as shot, for varying the weight of the weight member 101 may be passed.

On the rotating part or shaft 15 are a plurality of drive members 105 which yieldably rotate the film spools 86. These drive members 105 each consist of a ring having a V-shaped groove 106 therein, as shown in Fig. 3, of such size that a good driving engagement with the periphery 107 of a film spool flange 88 will be accomplished. The ring 105 is turnably mounted on a collar 108 which is fixed to the shaft 15 by use of a set screw 109. The ring 105 is held against axial movement between a permanent flange 111 on the collar 108 and a removable flange 112 which is secured to the collar 108 by screws 113. The inner cylindrical face 114 of the ring 105 frictionally engages the outer cylindrical face 115 of the collar 108 so that when a film spool 85 is in engagement with the groove 106, and, due to the rotative force exerted by the weight member 101 on the lever 95, forces the ring 105 in the direction indicated by an arrow 116, the frictional engagement of the faces 114 and 115 will transmit a frictional driving force from the collar 108 to the ring 105, which driving force will in turn be transmitted to the periphery of the film spool 85.

The speed of rotation of the film spool 95 is controlled by the speed of movement of the film 83 and the diameter of the body 120 of film wound on the hub 87 of the film spool 85. The sprockets 26 and 27 are so proportioned that the driving means or ring 105 will rotate the film spool 85 at a speed sufficient to wind the film 83 directly onto the hub 87 as fast as the film is fed to the hub 87 by the associated sprocket 31 or 32. As the diameter of the body 120 of film increases, the speed of rotation of the spool 85 will decrease and slippage will occur between the faces 114 and 115 of the members 105 and 108. The periphery 107 of the flange 88 is frictionally engaged by the sloping walls of the groove 106 with a force sufficient to cause the spool 85 and the ring 105 to rotate in geared relationship.

When it is desired to remove a filled film spool 85 from the device and replace such film spool with an empty spool, the corresponding lever 91 is swung outwardly into extended position such as indicated by the broken lines 96 in Fig. 3, so that the film spool will then be held in extended position, as indicated by broken lines 125, permitting it to be removed from the stub shaft 89 and replaced by an empty film spool on which the end of a consecutive film strip being fed forwardly over a pulling sprocket 55 may be threaded and the film spool then moved into engagement with a driving means 105 by swinging the lever 91 into upright position. The operative position of the lever 91 is substantially vertical so that the weight of the film spool and the varying amount of film wound thereon does not influence the pressure with which the film spool is held in engagement with its driving means 105. The pressure of the film spool 85 against the walls of the groove 106 of the driving means 105, and likewise the frictional engagement of the faces 114 and 115, are determined by the magnitude of the weight 101.

In the present use of my device, the springs 45 of the pulling means 31 and 32 are adjusted to create a film pulling force of two to three pounds or about twice the force necessary to pull the film through the developing and drying machine. This maximum pull which the pulling means is capable of exerting is less than one-fourth the strength of motion picture film; therefore, the possibility of rupturing the film by tension is practically avoided. The tension exerted by the driving means 105 is relatively small, as the weights 101 are established at a magnitude to produce a driving friction between the surfaces 114 and 115 but little greater than the driving effect necessary to produce rotation of the spool 85 on the stub shaft 89.

As shown in Figs. 1 and 4, a horizontal shelf 126 is extended across in front of the sprockets 55, and on this shelf 126 counting devices 127 are mounted in such position that the lever arms 128 of the counting devices will rest in the paths of projections, such as indicated at 130, carried on the sprockets 57.

In Fig. 7, I show a lever 91' mounted on a shaft 93' and rotated in clockwise direction by a counterweight 101' so as to lift a film spool 85' into engagement with a driving member 105' when the supporting arm 91' is in horizontal position. In this form of the invention a film 83' is carried over a pulling sprocket 32' and then travels over an idler 131 to the film spool 85'. A feature of this construction is that as the body of film wound on the film spool 85' grows larger, the weight thereof will operate to partly counterbalance the counterweight 101' and thus decrease the pressure of the film spool 85' against the driving member 105', thereby reducing the friction with which the film spool 85' is driven and avoiding the making of cinch marks on the inner portion of the wound film due to its being wound too tight upon the spool 85'.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. Take-up mechanism of the character described, including: a shaft; a body fixed to said shaft; a sleeve rotatably mounted on said shaft adjacent said body; spring means surrounding said shaft for frictionally engaging said sleeve with said body fixed to said shaft; a film engaging member rotatably mounted on said sleeve; and a clutch member axially slidable on said sleeve for drivably connecting said sleeve and said film engaging member.

2. Take-up mechanism of the character described, including: a shaft; a sleeve rotatably mounted on said shaft, said sleeve having a radial wall at the primary end thereof; a frictional driving member secured to said shaft adjacent said radial wall; a spring for applying force against the secondary end of said sleeve; a body on said shaft adjacent said sleeve; an axially movable member between said body and said spring; a nut threaded on the exterior of said axially movable member and engaging said body so as to move said axially movable member relative to said spring; a film engaging member rotatable on the secondary end of said sleeve; and a clutch member axially slidable on the primary end of said sleeve, said clutch member being adapted for engagement with said film engaging means whereby to drive said film engaging means from said sleeve.

3. Take-up mechanism of the character described including: a shaft; a sleeve rotatably mounted on said shaft; a frictional driving member secured to said shaft adjacent the primary end of said sleeve; a body on said shaft adjacent the secondary end of said sleeve; a spring surrounding said shaft and bearing on said body and on the secondary end of said sleeve to force the primary end of said sleeve to engage said frictional driving member; a film engaging member rotatable on said sleeve; and a clutch member adapted to engage said film engaging member with said sleeve.

4. A take-up mechanism of the character described including: a shaft; a sleeve rotatably mounted on said shaft, said sleeve having a radial wall at the primary end thereof; a frictional driving member secured to said shaft adjacent said radial wall; a body secured to said shaft adjacent the secondary end of said sleeve; a helical spring mounted on said shaft between said sleeve and said body adjacent the secondary end thereof; means for causing said spring to bear against said sleeve to cause it to engage said frictional driving member, a film engaging means surrounding said shaft; and means for making driving connection between said sleeve and said film engaging member.

5. Take-up mechanism of the character described including: a shaft; a sleeve member rotatably mounted on said shaft; a frictional driving member secured to said shaft adjacent the primary end of said sleeve,; a body secured to said shaft adjacent the secondary end of said sleeve; a spring mounted on said shaft between said sleeve and said body adjacent the secondary end of said sleeve; and a nut surrounding said shaft and threaded into said body adapted to vary the compression in said spring; a film engaging member rotatable on said sleeve; and clutch means adapted to engage said sleeve with said film engaging member.

6. Take-up mechanism of the character described including: a shaft; a sleeve rotatably mounted on said shaft; a frictional driving member secured to said shaft adjacent the primary end of said sleeve; a body on said shaft adjacent the secondary end of said sleeve; a spring surrounding said shaft and bearing on said body and on the secondary end of said sleeve to force the primary end of said sleeve to engage said frictional driving member; and a film engaging member on said sleeve; and a clutch adapted to engage said sleeve with said film engaging member.

7. A take-up mechanism of the character described including: a shaft; a sleeve rotatably mounted on said shaft, said sleeve having a radial wall at the primary end thereof; a frictional driving member secured to said shaft adjacent said radial wall; a body secured to said shaft adjacent the secondary end of said sleeve; a helical spring mounted on said shaft between said sleeve and said body adjacent the secondary end thereof; means for causing said spring to bear against said sleeve to cause it to engage said frictional driving member; and a film engaging member fixed on said sleeve.

8. Take-up mechanism of the character described including: a shaft; a sleeve rotatably mounted on said shaft; a frictional driving member secured to said shaft adjacent the primary end of said sleeve; a body on said shaft adjacent the secondary end of said sleeve; spring means adapted to force the primary end of said sleeve into frictional engagement with said driving member; a film engaging member rotatable on said sleeve; and a clutch member adapted to engage said sleeve with said film engaging member.

9. Take-up mechanism of the character described including: a shaft; a rotatable member mounted on said shaft; a frictional driving member secured to said shaft adjacent said rotatable member; spring means for causing engagement between said rotatable member and said frictional driving member; a film engaging member rotatable on said rotatable member; and clutch means adapted to engage said film engaging member with said sleeve.

BRUCE BURNS.